United States Patent [19]

Makuuchi et al.

[11] Patent Number: 5,565,160
[45] Date of Patent: Oct. 15, 1996

[54] SQUEEZABLE TUBULAR CONTAINER AND PROCESS FOR THE PRODUCTION THEREOF

[75] Inventors: Keizo Makuuchi; Fumio Yoshii, both of Takasaki; Yasuo Futami, Ichihara; Masanobu Ishiyama, Ichihara; Gen Miyamoto, Ichihara; Hideo Kushida, Yachiyo; Sei Nakajima, Chiba; Takahiro Kurihara, Fujioka; Ryoji Sugawara, Funabashi; Hideshi Kawachi, Iwakuni; Mikio Nakagawa, Ohno-cho, all of Japan

[73] Assignees: Mitsui Petrochemical Industries, Ltd.; Yoshino Kogyosho Co., Ltd.; Japan Atomic Energy Research Institute, all of Tokyo, Japan

[21] Appl. No.: 453,673

[22] Filed: May 30, 1995

Related U.S. Application Data

[63] Continuation of Ser. No. 139,753, Oct. 22, 1993, abandoned.

[30] Foreign Application Priority Data

Oct. 26, 1992 [JP] Japan .................................. 4-287906
Apr. 14, 1993 [JP] Japan .................................. 5-087636
Apr. 14, 1993 [JP] Japan .................................. 5-087637

[51] Int. Cl.⁶ .................................................. B29C 71/04
[52] U.S. Cl. .......................... 264/485; 264/515; 264/209.3; 264/210.1; 264/211.12; 264/210.3; 156/275.5; 430/296
[58] Field of Search .......................... 156/273.3, 273.7, 156/275.1, 275.3, 275.5, 244.17; 264/22, 25, 515, 209.3, 209.6, 210.1, 211.12, 210.3; 250/492.2

[56] References Cited

U.S. PATENT DOCUMENTS

| | | | |
|---|---|---|---|
| 4,056,421 | 11/1977 | Jarvis | 156/272 |
| 5,043,204 | 8/1991 | Itaba et al. | 428/213 |

FOREIGN PATENT DOCUMENTS

| | | |
|---|---|---|
| 0022184 | 1/1981 | European Pat. Off. . |
| 0068271 | 1/1983 | European Pat. Off. . |
| 0236099 | 2/1986 | European Pat. Off. . |
| 0323852 | 1/1988 | European Pat. Off. . |
| 0319258 | 6/1989 | European Pat. Off. . |
| 0409615 | 1/1991 | European Pat. Off. . |
| 52-150458 | 12/1977 | Japan . |
| 55-131027 | 10/1980 | Japan . |
| 60-35030 | 2/1985 | Japan . |

OTHER PUBLICATIONS

Rapra Abstracts, Properties and Morphology of Oriented Ternary Blends of PEPT/HDPE/Compatibilising Agent, Sambara, Jabarin.
Database WPI, AN 87–133786, Abstract.
European Search Report.

*Primary Examiner*—Charles Nold

[57] ABSTRACT

A squeezable tubular container (a) which is formed from a composition containing a polyethylene having a density of 0.900 to 0.975 g/cm$^3$ and an ethylene/α-olefin copolymer having a density smaller than 0.900 g/cm$^3$, (b) has a crosslinking caused under irradiation with electron beam, and (c) is sterilizable at a high temperature or is heat-sealable or ultrasonically sealable; and a process for the production thereof.

9 Claims, No Drawings

5,565,160

SQUEEZABLE TUBULAR CONTAINER AND PROCESS FOR THE PRODUCTION THEREOF

This application is a continuation of application Ser. No. 08/139,753 filed on Oct. 22, 1993, now abandoned.

BACKGROUND OF THE INVENTION

The present invention relates to a squeezable tubular container and a process for the production thereof. More specifically, it relates to a squeezable tubular container which is formed from a composition of polyethylene and an ethylene/α-olefin copolymer and which is sterilizable at a high temperature or is heat-sealable or ultrasonically sealable, and a process for the production thereof.

With an advance in the modification of materials for packaging containers, there have been and are proposed containers which have the property of withstanding against sterilization treatment at a high temperature for a relatively long period of time such as retort treatment containers. Of these containers, there is actually used a container formed from a raw material prepared by laminating a polyolefin layer of polypropylene or high-density polyethylene on each surface of an oxygen-barrier resin layer, which is an intermediate layer and is formed of a thermoplastic resin such as highly heat-resistant polypropylene or high-density polyethylene; a saponification product of an ethylene-vinyl acetate copolymer; or nylon.

Since, however, the above raw material has a high elastic modulus, it cannot be necessarily said that such a raw material is suitable for a squeezable tubular container required to have flexibility. Low-density polyethylene has excellent flexibility but has a high shrinkage factor, and the defect is that it shrinks when subjected to high-temperature sterilization treatment. Low-density polyethylene is therefore not suitable as a raw material for a squeezable tubular container which is to be retort-sterilized.

On the other hand, it is well known that polyolefins typified by polyethylene undergoes a crosslinking reaction by radiation such as electron beam to improve heat resistance, chemical resistance and mechanical strength. For example, such polyolefins are practically used in cables and heat-shrinkable films. The improvement in the heat resistance, etc., is attributed to a three-dimensional net structure of molecules caused by the crosslinking. Since, however, three-dimensionally structured polyethylene is generally not melted even at a temperature higher than its melting point, it is poor in fusibility when fused by means of heat sealing or ultrasonic sealing, and the sealed portion is liable to peel with time or at the time of high-temperature sterilization treatment. Therefore, the polyethylene is not proper as a raw material for containers such as a squeezable tubular container required to tightly close a content therein by fusion such as heat sealing or ultrasonic sealing.

SUMMARY OF THE INVENTION

It is therefore an object of the present invention to provide a squeezable tubular container which is almost free from heat shrinkage under high-temperature sterilization treatment, for example, at 121° C. for about 30 minutes, and which is excellent in flexibility.

It is another object of the present invention to provide a squeezable tubular container which is almost free from heat shrinkage and excellent in flexibility, and which is also excellent in barrier properties against oxygen.

It is further another object of the present invention to provide a squeezable tubular container which is excellent in heat resistance and chemical resistance, and which is heat sealable or ultrasonically sealable.

It is still further another object of the present invention to provide a process for advantageously producing the above squeezable tubular container of the present invention.

Other objects and advantages of the present invention will be apparent from the following description.

According to the present invention, the above objects and advantages of the present invention are achieved, first, by a squeezable tubular container (to be sometimes referred to as "first container" hereinafter);

(a) which is formed from a composition containing a polyethylene having a density of 0.900 to 0.975 g/cm$^3$ and an ethylene/α-olefin copolymer having a density smaller than 0.900 g/cm$^3$, (b) which has a crosslinking caused under irradiation with electron beam, and (c) which is sterilizable at a high temperature.

The above composition (a) comprises polyethylene and an ethylene/α-olefin copolymer.

The density of the polyethylene is 0.900 to 0.975 g/cm$^3$, particularly preferably 0.930 to 0.940 g/cm$^3$.

The melt flow rate (MFR: ASTM D 1238, 190° C.) of the polyethylene is preferably 0.01 to 10 g/10 minutes, particularly preferably 0.1 to 5 g/10 minutes.

As the ethylene/α-olefin copolymer, preferred is an ethylene-α-olefin copolymer having low crystallizability of preferably 40% or less, particularly preferably 10% or less. The density thereof is smaller than 0.900 g/cm$^3$, preferably 0.850 to 0.900 g/cm$^3$, particularly preferably 0.860 to 0.895 g/cm$^3$. The α-olefin to be copolymerized with ethylene is preferably selected, for example, from propylene, butene-1, pentene-1 and 4-methylpentene-1. Particularly preferred are propylene and butene-1.

In the ethylene-α-olefin copolymer, the ethylene/α-olefin molar ratio is preferably 95/5 to 70/30, more preferably 90/10 to 75/25.

Further, the melt flow rate of the ethylene-α-olefin copolymer is preferably 0.1 to 10 g/10 minutes, particularly preferably 0.2 to 5 g/10 minutes.

In the composition (a), the amount of the ethylene-α-olefin copolymer based on the total amount of the polyethylene and the ethylene-α-olefin copolymer is preferably 5 to 50% by weight, more preferably 10 to 40% by weight. The composition (a) may contain additives known per se such as a filler, a stabilizer, a lubricant, an antistatic agent, a flame retardant and a foaming agent in such an amount that the objects of the present invention are not impaired.

The first container of the present invention has characteristic features in that it is formed of the above composition, has a crosslinked caused under irradiation with electron beam and is sterilizable at a high temperature.

According to the present invention, the above first container of the present invention is advantageously produced by a process which comprises irradiating a tubular container having a wall thickness of 0.3 to 1 mm, preferably 0.5 to 0.8 mm, formed from a composition containing a polyethylene having a density of 0.900 to 0.975 /cm$^3$ and an ethylene/α-olefin copolymer having a density smaller than 0.900 g/cm$^3$, with electron beam to crosslink the tubular container, thereby making the container sterilizable at a high temperature.

The above tubular container can be prepared from the above composition containing a polyethylene and an ethylene/α-olefin copolymer by a known method using a screw extruder or the like. The tubular container is irradiated with electron beam. In the irradiation with electron beam, the tubular container is irradiated with electron beam at the dosage in the range of 50 to 500 kGy, preferably 100 to 300 kGy, by means of a known apparatus for irradiation with electron beam. Under the irradiation with electron beam, the polyethylene and ethylene-α-olefin copolymer which constitute the above composition undergo crosslinking, and for example, the gel percentage increases to 40% or more. As a result, the hot water free shrinkage factor (measured after heat-treating a sample in an autoclave at 121° C. for 30 minutes) can be decreased to 3% or less, and there can be provided a high-temperature sterilizable squeezable tubular container without impairing the flexibility inherent to the above composition.

At some dose of electron beam, the polyethylene and ethylene-α-olefin copolymer which constitute the above composition undergo crosslinking to come into a so-called gel state by forming a three-dimensional net structure. And, it is sometimes difficult to melt the composition even at a temperature higher than its melting point, and the heat sealability of the composition is impaired. Therefore, the tubular container is irradiated with the sealing portion being masked, whereby there can be obtained a high-temperature sterilizable squeezable tubular container having good sealability, which also has the flexibility inherent to the above composition.

The above first container exhibits a very low shrinkage factor in retort-sterilization at a high temperature, and is excellent for squeezing out a content contained therein.

Further, the above first container can be heat or ultrasonically sealed.

That is, according to the present invention, secondly, there is provided a container (to be sometimes referred to as "second container" hereinafter):

(a) which is formed from a composition containing a polyethylene having a density of 0.900 to 0.975/cm$^3$ and an ethylene/α-olefin copolymer having a density smaller than 0.900 g/cm$^3$, (b) which has been irradiated with electron beam in a thickness direction at such a dose that the penetration capability of the electron beam, when the relative dose of the electron beam on a surface is 100%, is 60 to 80 in a mid-point of the thickness and 40% or less on the reverse surface, and has a crosslinking at least on the surface thereof, and (c) which is heat or ultrasonically sealable or sealed and is sterilizable at a high temperature.

The above polyethylene and ethylene/α-olefin copolymer are selected from those described concerning the first container. The density of the polyethylene used for the second container is preferably 0.920 to 0.950 g/cm$^3$, more preferably 0.935 to 0.940 g/cm$^3$. It should be understood that the description on the first container can be applied to the second container unless otherwise specified.

According to the present invention, the second container of the present invention can be advantageously produced by a process which comprises irradiating a tubular container formed from a composition containing a polyethylene having a density of 0.900 to 0.975 /cm$^3$ and an ethylene/α-olefin copolymer having a density smaller than 0.900 g/cm$^3$, with electron beam in a thickness direction at such a dose that the penetration capability of the electron beam, when the relative dose of the electron beam on a surface is 100%, is 60 to 80% in a mid-point of the thickness and 40% or less on the other surface, to crosslink the tubular container with the sealing portion being masked, thereby making the container heat or ultrasonically sealable.

The greatest technical feature of the above process is that an electron beam having a specific penetration capability is used for irradiating a container formed from a composition containing the above polyethylene and the above ethylene/α-olefin copolymer by any one of known molding methods such as an injection molding method and an extrusion molding method.

In the above process of the present invention, it is important to set the acceleration voltage of electron beam or the distance between the irradiation aperture and the article to be irradiated such that the penetration capability of electron beam, when the dose of electron beam on the article surface is 100%, is 60 to 80% in a mid-point in the thickness direction of the article and 40% or less on the other surface of the article. The absorbed dose on the article surface is 50 to 500 kGy, preferably 100 to 300 kGy.

When the irradiation with the above-specified electron beam is carried out, there can be obtained an article of the composition whose crosslinkage degree changes so as to form layers.

The above crosslinked composition gives a container which has fusibility equivalent to that of non-irradiated polyethylene and has heat resistance comparable to that of an article irradiated with electron beam uniformly through its thickness direction.

The above second container is heat or ultrasonically sealable or sealed, and can be used as a container required to be tightly closed by fusion such as a squeezable tubular container or cup-like container.

The container can be obtained as a container formed from the above composition alone or as a container of a multi-layered laminate structure having at least two layers, a combination of a layer formed from the above composition as a fusible layer and a layer formed from a resin having gas barrier properties such as nylon or a saponification product of an ethylene-vinyl acetate copolymer. In the latter case, for improving the adhesion between the composition and the resin having gas barrier properties, the polyethylene may be preliminarily modified with an unsaturated carboxylic acid or its anhydride, or the composition may be subjected to adhesion improvement means such as corona discharging.

The container having a laminate structure will be detailed hereinafter.

That is, according to the present invention, thirdly, there is provided a container (to be sometimes referred to as "third container" hereinafter):

(a) which is formed of inner and outer layers of a composition containing a polyethylene graft-modified with an unsaturated carboxylic acid or its derivative and having a density of 0.900 to 0.975 g/cm$^3$ and an ethylene/α-olefin copolymer having a density smaller than 0.900 g/cm$^3$, and an intermediate layer of a resin having barrier properties against oxygen, (b) which has been irradiated with electron beam and has a crosslinking at least in the outer layer, and (c) which is sterilizable at a high temperature.

The greatest technical feature of the third container of the present invention is that the squeezable tubular laminated container formed of inner and outer layers obtained from a composition containing a polyethylene graft-modified with an unsaturated carboxylic acid or its derivative and having a density of 0.900 to 0.975 g/cm³ and an ethylene/α-olefin copolymer having a density smaller than 0.900 g/cm³, and an intermediate layer obtained from a resin having barrier properties against oxygen, is irradiated with electron beam.

The amount ratio (A/B) of (A) the polyethylene graft-modified with an unsaturated carboxylic acid or its derivative and having a density of 0.900 to 0.975 g/cm³ and (B) the ethylene/α-olefin copolymer having a density smaller than 0.900 g/cm³ is preferably 50 to 95% by weight/50 to 5% by weight, particularly preferably 60 to 90% by weight/40 to 10% by weight.

The density of the polyethylene used in the present invention is 0.900 to 0.975 g/cm³, preferably 0.920 to 0.975 g/cm³, particularly preferably 0.935 to 0.970 g/cm³. The melt flow rate (MFR: ASTM D 1238, 190° C.) of the above polyethylene is preferably 0.01 to 10 g/10 minutes, more preferably 0.1 to 5 g/10 minutes. The above polyethylene includes an ethylene homopolymer and a copolymer of ethylene and a small amount of other α-olefin such as propylene or 1-butene.

The unsaturated carboxylic acid or its derivative includes acrylic acid, methacrylic acid, α-ethylacrylic acid, maleic acid, fumaric acid, itaconic acid, citraconic acid, tetrahydrophthalic acid, methyltetrahydrophthalic acid, endo-cis-bicyclo[2.2.1]hept-5-ene-2,3-dicarboxylic acid (Nadic acid), and derivatives such as acid halides, amides, imides, acid anhydrides and esters of these. Of these, preferred are unsaturated dicarboxylic acids and acid arthydrides thereof, and particularly preferred are maleic acid, Nadic acid and acid anhydrides of these.

The unsaturated carboxylic acid or its derivative can be grafted on polyethylene having a density of 0.900 to 0.975 g/cm³ by any one of known various methods. For example, the ethylene homopolymer or copolymer and the graft monomer are heated to a high temperature in the presence or absence of a solvent together with, or without, a radical initiator. In the reaction, other vinyl monomer such as styrene may be co-present.

The amount of the above graft monomer grafted on the polyethylene (graft ratio) is preferably 0.001 to 10% by weight, particularly preferably 0.01 to 1% by weight. The polyethylene used in the present invention may be a polyethylene of which part or the whole is graft-modified. From the industrial point of view, for adjusting the graft monomer concentration in the polyethylene, it is preferred to prepare in advance a modified polyethylene having a graft ratio of approximately 0.1 to 10% by weight and then incorporate this modified polyethylene into non-modified polyethylene. In this case, the so-obtained polyethylene is a mixture of graft-modified polyethylene with non-modified polyethylene, and hence, part of polyethylene is graft-modified.

The ethylene-α-olefin copolymer is selected from those described concerning the above first container.

The resin having barrier properties against oxygen, which constitutes the intermediate layer of the squeezable tubular container of the present invention, includes, for example, nylon and a saponification product of an ethylene-vinyl acetate copolymer. As the nylon, there are used long-chain synthetic polyamides having a recurring amide group as an integral part of a polymer chain, such as nylon 6, nylon 6-6, nylon 6-10, nylon 11 and nylon 12.

As the saponification product of an ethylene-vinyl acetate copolymer, for example, there is used a saponification product which is obtained by saponifying an ethylene-vinyl acetate copolymer having an ethylene content of 26 to 65 mol % by a known method and has a saponification degree of at least 96%, preferably at least 99%. An ethylene-vinyl acetate copolymer having an ethylene content and a saponification degree in the above ranges is excellent not only in barrier properties against oxygen but also in such properties as mechanical properties, oil resistance and water resistance, and it is suitable for the object of the present invention.

The third container of the present invention can be advantageously produced by a process which comprises irradiating a tubular laminated container formed of inner and outer layers (to be sometimes referred to as (A) layer hereinafter) of composition containing a polyethylene graft-modified with an unsaturated carboxylic acid or its derivative and having a density of 0.900 to 0.975 g/cm³ and an ethylene/α-olefin copolymer having a density smaller than 0.900 g/cm³, and an intermediate layer (to be sometimes referred to as (B) layer hereinafter) of a resin having barrier properties against oxygen, with electron beam to crosslink at least the outer layer, thereby making the above tubular laminated container sterilizable at a high temperature.

The inner and outer layers of the composition containing a polyethylene graft-modified with an unsaturated carboxylic acid or its derivative and having a density of 0.900 to 0.975 g/cm³ and an ethylene/α-olefin copolymer, and the intermediate layer of a resin having barrier properties against oxygen can be produced, for example, by co-extrusion or extrusion coating according to a known molding method using a screw extruder.

The tubular container of the present invention can be obtained by cutting a tubular body obtained by the above extrusion method at a proper length, heat sealing one end of the cut tube, and attaching a separately molded opening portion to the other end by fusion.

In the constitution of the tubular third container of the present invention, it is important that the (A) layer and the (B) layer are adjacent to each other. Further, the tubular third container may have an outermost layer (C) formed of a composition containing non-modified polyethylene having a density of 0.900 g/cm³ to 0.975 g/cm³ and an ethylene-α-olefin copolymer. Further, the tubular third container may have an innermost layer (D) formed of a composition containing non-modified polyethylene having a density of 0.900 g/cm³ to 0.975 g/cm³ and an ethylene-α-olefin copolymer so long as it has the structure of (A)/(B)/(A) layers.

The layer structure of the tubular third container includes, for example, (A)/(B)/(A), (C)/(A)/(B)/(A), (C)/(A)/(B)/(A)/(C), (A)/(B)/(A)/(D), (C)/(A)/(B)/(A)/(D) and (C)/(A)/(B)/(A)/(C)/(D).

Concerning the thickness of each layer of the tubular third container, preferably, the outer layer is 50 to 300 μm thick, the intermediate layer is 5 to 150 μm thick and the inner layer is 50 to 300 μm thick. Particularly preferably, the outer layer is 100 to 200 μm thick, the intermediate layer is 30 to 75 μm thick and the inner layer is 200 to 300 μm thick. The total thickness of the wall of the tubular third container is preferably 380 to 500 μm.

In the present invention, it is a characteristic feature to irradiate the above-structured tubular container with electron beam.

In the irradiation with electron beam, the tubular third container is irradiated with electron beam at the dosage in the range of 50 to 500 kGy, preferably 100 to 300 kGy, by means of a known apparatus for irradiation with electron beam. Under the irradiation with electron beam, the polyethylene and ethylene-α-olefin copolymer which constitute the above composition undergo crosslinking, and the gel percentage increases to 40% or more. As a result, the hot water free shrinkage factor (measured after heat-treating a sample in an autoclave at 121° C. for 30 minutes) can be decreased to 3% or less, and there can be provided a high-temperature sterilizable squeezable tubular container without impairing the flexibility inherent to the above composition.

At some dose of electron beam, the polyethylene and ethylene-α-olefin copolymer which constitute the above composition undergo crosslinking to come into a so-called gel state by forming a three-dimensional net structure. And, it is sometimes difficult to melt the composition even at a temperature higher than its melting point, and the heat sealability of the composition is impaired. Therefore, the tubular third container is irradiated with the sealing portion being masked, whereby there can be obtained a high-temperature sterilizable squeezable tubular container which is excellent in barrier properties against oxygen and has the flexibility inherent to the above composition.

In addition, it should be understood that the description on the first and second containers should be applied to the third container of the present invention where explanations are omitted.

DETAILED DESCRIPTION OF THE EXAMPLES OF THE INVENTION

The present invention will be more specifically explained with reference to Examples, while the present invention shall not be limited by these Examples.

Containers obtained in Examples were evaluated by the following methods.

(a) Resisting force is an index for evaluating the flexibility of a container, and it refers to a stress measured when a tubular container is compressed to be brought into a bulged state having a short diameter of 10 mm by exerting a load weight (compression rate 100 mm/minute) on the surface of its tube portion from above the tube portion. A container showing a resisting force of 1.5 kgf or less is evaluated as one having desirable flexibility.

(b) Hot water free shrinkage factor refers to a shrinkage percentage of a sample measured after a sample is treated in an autoclave at 121° C. for 30 minutes. A container showing a hot water free shrinkage factor of 3% or less is evaluated as one having desirable heat resistance.

(c) Fusibility is expressed by way of a breaking strength (kg/15 mm) measured by heat sealing a rectangular sample piece having a width of 15 mm with a heat sealing portion being 3 mm wide, and tensioning in the 180° directions at 100 mm/minute. A container showing a fusibility of at least 4.5 kg is evaluated as one having desirable fusibility.

(d) Gel percentage refers to a residual weight percentage after a sample (resin having barrier properties against oxygen is removed in the case of a laminated container) is boiled in xylene for 24 hours, and it is an index for evaluating heat resistance and chemical resistance. A container showing a gel percentage of at least 40% is evaluated as one having desirable heat resistance and chemical resistance.

(e) For the penetration capability of electron beam to a sample, a relative dose was measured with a 38 μm thick CTA (cellulose triacetate) dosimeter (supplied by Fuji Photo Film Co., Ltd.).

EXAMPLE 1

An intermediate-density polyethylene having a density of 0.938 g/cm³ and a melting point of 125° C. and an ethylene-propylene copolymer (ethylene content 80 mol %) were mixed in a mixing ratio of 70:30 (weight ratio) to obtain a composition having a density of 0.916 g/cm³, and the composition was extruded from a die by means of a screw having a diameter of 40 mm and an effective length of 1,000 mm at a die temperature of 190° C. to give a tubular molded article. The tubular molded article was heat sealed in one end portion to give a tubular container having a wall thickness of 0.45 mm, an internal diameter of 40 mm and a length of 150 mm. The tubular container was irradiated with electron beam at 100 kGy, and the resultant sample was measured for a gel percentage, hot water free shrinkage factor and resisting force. Table 1 shows the results.

EXAMPLE 2

A high-density polyethylene having a density of 0.953 g/cm³ and a melting point of 130° C. and an ethylene-propylene copolymer were mixed in a mixing ratio of 70:30 (weight ratio) to obtain a composition having a density of 0.925 g/cm³, and the composition was extruded from a die by means of a screw having a diameter of 40 mm and an effective length of 1.000 mm at a die temperature of 190° C. to give a tubular molded article. The tubular molded article was heat sealed in one end portion to give a tubular container having a wall thickness of 0.45 mm, an internal diameter of 40 mm and a length of 150 mm. The tubular container was irradiated with electron beam at 100 kGy, and the. resultant sample was measured for a gel percentage, hot water free shrinkage factor and resisting force.

Table 1 shows the results.

EXAMPLE 3

A linear low-density polyethylene having a density of 0.921 g/cm³ and a melting point of 117° C. and an ethylene-propylene copolymer were mixed in a mixing ratio of 90:10 (weight ratio) to obtain a composition having a density of 0.916 g/cm³, and the composition was extruded from a die by means of a screw having a diameter of 40 mm and an effective length of 1,000 mm at a die temperature of 190° C. to give a tubular molded article. The tubular molded article was heat sealed in one end portion to give a tubular container having a wall thickness of 0.45 mm, an internal diameter of 40 mm and a length of 150 mm. The tubular container was irradiated with electron beam at 150 kGy, and the resultant sample was measured for a gel percentage, hot water free shrinkage factor and resisting force. Table 1 shows the results.

EXAMPLE 4

A linear low-density polyethylene having a density of 0.924 g/cm³ and a melting point of 119° C. and an ethylene-propylene copolymer were mixed in a mixing ratio of 90:10 (weight ratio) to obtain a composition having a density of 0.917 g/cm³, and the composition was extruded from a die by means of a screw having a diameter of 40 mm and an effective length of 1,000 mm at a die temperature of 190° C. to give a tubular molded article. The tubular molded article was heat sealed in one end portion to give a tubular container having a wall thickness of 0.45 mm, an internal diameter of 40 mm and a length of 150 mm. The tubular container was irradiated with electron beam at 200 kGy, and the resultant sample was measured for a gel percentage, hot water free shrinkage factor and resisting force. Table 1 shows the results.

COMPARATIVE EXAMPLE 1

An intermediate-density polyethylene having a density of 0.935 g/cm$^3$ and a melting point of 125° C. and an ethylene-propylene copolymer (ethylene content 80 mol %) were mixed in a mixing ratio of 70:30 (weight ratio) to obtain a composition having a density of 0.916 g/cm$^3$, and the composition was extruded from a die by means of a screw having a diameter of 40 mm and an effective length of 1,000 mm at a die temperature of 190° C. to give a tubular molded article. The tubular molded article was heat sealed in one end portion to give a tubular container having a wall thickness of 0.45 mm, an internal diameter of 40 mm and a length of 150 mm. The tubular container was measured for a gel percentage, hot water free shrinkage factor and resisting force. Table 1 shows the results.

COMPARATIVE EXAMPLE 2

An intermediate-density polyethylene having a density of 0.935 g/cm$^3$ and a melting point of 125° C. was extruded from a die by means of a screw having a diameter of 40 mm and an effective length of 1,000 mm at a die temperature of 190° C. to give a tubular molded article. The tubular molded article was heat sealed in one end portion to give a tubular container having a wall thickness of 0.45 mm, an internal diameter of 40 mm and a length of 150 mm. The tubular container was irradiated with electron beam at 100 kGy, and the resultant sample was measured for a gel percentage, hot water free shrinkage factor and resisting force. Table 1 shows the results.

TABLE 1

|  | Ex.1 | Ex.2 | Ex.3 | Ex.4 | CEx.1 | CEx.2 |
| --- | --- | --- | --- | --- | --- | --- |
| Gel percentage (%) | 56.1 | 40.5 | 60.8 | 69.7 | 0.0 | 25.3 |
| Hot water free shrinkage factor (%) | −2.9 | −2.8 | −3.0 | −2.8 | −6.2 | −2.8 |
| Resisting force (kgf) | 0.9 | 1.3 | 0.7 | 0.8 | 0.9 | 2.7 |

Ex. = Example, CEx. = Comparative Example

EXAMPLE 5

An intermediate-density polyethylene having a density of 0.938 g/cm$^3$ and a melting point of 125° C. and an ethylene-propylene copolymer (ethylene content 80 mol %) were mixed in a mixing ratio of 70:30 (weight ratio) to obtain a composition having a density of 0.916 g/cm$^3$, and the composition was extrusion-molded to give a tubular molded article having a wall thickness of 0.45 mm, an internal diameter of 40 mm and a length of 150 mm. The tubular molded article was heat sealed in one end portion to give a tubular container. The tubular container was irradiated with electron beam at an acceleration voltage of 250 kV at a distance of 7.5 cm from an aperture at a surface dose of 300 kGy. In this case, the relative doses on the surface, the mid-point and the reverse surface were 100, 70 and 3%, respectively.

The above-obtained sample was measured for a heat seal strength, hot water free shrinkage factor, gel percentage and resisting force. Table 2 shows the results.

EXAMPLE 6

A linear low-density polyethylene having a density of 0.924 g/cm$^3$ and a melting point of 117° C. and an ethylene-propylene copolymer (ethylene content 80 mol %) were mixed in a mixing ratio of 90:10 (weight ratio) to obtain a composition having a density of 0.916 g/cm$^3$, and the composition was extrusion-molded to give a tubular molded article having a wall thickness of 0.45 mm, an internal diameter of 40 mm and a length of 150 mm. The tubular molded article was heat sealed in one end portion to give a tubular container. The tubular container was irradiated with electron beam at an acceleration voltage of 250 kV at a distance of 7.5 cm from an aperture at a surface dose of 300 kGy. In this case, the relative doses on the surface, the mid-point and the reverse surface were 100, 70 and 3%, respectively.

The above-obtained sample was measured for a heat seal strength, hot water free shrinkage factor, gel percentage and resisting force. Table 2 shows the results.

EXAMPLE 7

An intermediate-density polyethylene having a density of 0.938 g/cm$^3$ and a melting point of 125° C. and an ethylene-propylene copolymer (ethylene content 80 mol %) were mixed in a mixing ratio of 70:30 (weight ratio) to obtain a composition having a density of 0.916 g/cm$^3$, and the composition was extrusion-molded to give a tubular molded article having a wall thickness of 0.45 mm, an internal diameter of 40 mm and a length of 150 mm. The tubular molded article was heat sealed in one end portion to give a tubular container. The tubular container was irradiated with electron beam at an acceleration voltage of 260 kV at a distance of 7.5 cm from an aperture at a surface dose of 300 kGy. In this case, the relative doses on the surface, the mid-point and the reverse surface were 100, 75 and 20%, respectively.

The above-obtained sample was measured for a heat seal strength, hot water free shrinkage factor, gel percentage and resisting force. Table 2 shows the results.

COMPARATIVE EXAMPLE 3

A linear low-density polyethylene having a density of 0.924 g/cm$^3$ and a melting point of 117° C. and an ethylene-propylene copolymer (ethylene content 80 mol %) were mixed in a mixing ratio of 90:10 (weight ratio) to obtain a composition having a density of 0.916 g/cm$^3$, and the composition was extrusion-molded to give a tubular molded article having a wall thickness of 0.45 mm, an internal diameter of 40 mm and a length of 150 mm. The tubular molded article was heat sealed in one end portion to give a tubular container.

The above tubular container was measured for a heat seal strength, hot water free shrinkage factor, gel percentage and resisting force. Table 2 shows the results.

COMPARATIVE EXAMPLE 4

An intermediate-density polyethylene having a density of 0.938 g/cm$^3$ and a melting point of 125° C. and an ethylene-propylene copolymer (ethylene content 80 mol %) were mixed in a mixing ratio of 70:30 (weight ratio) to obtain a composition having a density of 0.916 g/cm$^3$ and the composition was extrusion-molded to give a tubular molded article having a wall thickness of 0.45 mm, an internal diameter of 40 mm and a length of 150 mm. The tubular molded article was heat sealed in one end portion to give a tubular container.

The above tubular container was measured for a heat seal strength, hot water free shrinkage factor, gel percentage and resisting force. Table 2 shows the results.

TABLE 2

|  | Ex.5 | Ex.6 | Ex.7 | CEx.3 | CEx.4 |
| --- | --- | --- | --- | --- | --- |
| Heat seal strength (kg/15 mm) | 5.8 | 6.0 | 5.3 | 6.0 | 5.8 |
| Hot water free shrinkage factor (%) | −2.4 | −1.7 | −2.9 | −25.5 | −6.2 |
| Gel percentage (%) | 57.0 | 61.1 | 52.9 | 0 | 0 |
| Resisting force (kgf) | 0.9 | 0.8 | 0.9 | 0.8 | 0.9 |

Ex. = Example, CEx. = Comparative Example

EXAMPLE 8

A composition prepared by mixing a modified intermediate-density polyethylene which was graft modified with 0.17% by weight of maleic anhydride and had a density of 0.938 g/cm$^3$ and an ethylene-propylene copolymer (ethylene content 80 mol %) in a mixing ratio of 70:30 was used for forming inner and outer layers. "EVAL" (registered trade name, EP-F (MFR 1.3), supplied by Kuraray Co., Ltd.) as a resin having barrier properties against oxygen was used for forming an intermediate layer. The above composition and "EVAL" were co-extrusion molded to give a tubular molded article having outer layer/intermediate layer/inner layer thicknesses of 150/50/250 μm, an internal diameter of 40 mm and a length of 150 mm. The tubular molded article was heat sealed in one end portion to give a tubular container. The tubular container was irradiated with electron beam at an acceleration voltage of 250 kV at a distance of 7.5 cm from an aperture at a surface dose of 800 kGy. In this case, the relative doses on the surface, the mid-point and the reverse surface were 100, 70 and 3%, respectively.

The above-obtained sample was measured for a heat seal strength, hot water free shrinkage factor, gel percentage, resisting force and oxygen permeability. Table 3 shows the results.

COMPARATIVE EXAMPLE 5

A modified low-density polyethylene which was graft modified with 0.15% by weight of maleic anhydride and had a density of 0.920 g/cm$^3$ was used for forming inner and outer layers. "EVAL" (registered trade name, EP-F (MFR 1.3), supplied by Kuraray Co., Ltd.) as a resin having barrier properties against oxygen was used for forming an intermediate layer. The above polyethylene and "EVAL" were co-extrusion molded to give a tubular molded article having outer layer/intermediate layer/inner layer thicknesses of 150/50/250 μm, an internal diameter of 40 mm and a length of 150 mm. The tubular molded article was heat sealed in one end portion to give a tubular container.

The above tubular container was measured for a heat seal strength, hot water free shrinkage factor, gel percentage, resisting force and transmitted oxygen amount. Table 3 shows the results.

TABLE 3

|  | Ex.8 | CEx.5 |
| --- | --- | --- |
| Heat seal strength (kg/15 mm) | 4.9 | 4.5 |
| Hot water free shrinkage | −2.6 | −5.5 |

TABLE 3-continued

|  | Ex.8 | CEx.5 |
| --- | --- | --- |
| factor (%) | | |
| Gel percentage (%) | 55.8 | 0 |
| Resisting force (kgf) | 1.4 | 1.3 |
| Oxygen permeability (cc/day) | 0.002 | 0.002 |

EXAMPLE 9

Layers having the following constitutions were formed by the co-extrusion under the following conditions to obtain a tubular container.

Outer layer:

A composition (A) (density 0.916 g/cm$^3$) obtained by mixing a modified intermediate-density polyethylene which was graft modified with 0.17% by weight of maleic anhydride and had a density of 0.938 g/cm$^3$ and an ethylene-propylene copolymer (ethylene content 80 mol %) in a mixing ratio of 70:30 was extruded by means of a screw having a diameter of 40 mm and an effective length of 1,000 mm at 190° C.

Intermediate layer:

"EVAL" (B) (registered trade name, EP-F, MFR 1.3, supplied by Kuraray Co., Ltd.) as a resin having barrier properties against oxygen was extruded by means of a screw having a diameter of 30 mm and an effective length of 750 mm at 225° C.

Inner layer:

A composition (A) (density 0.916 g/cm$^3$) obtained by mixing a modified intermediate-density polyethylene which was graft modified with 0.17% by weight of maleic anhydride and had a density of 0.938 g/cm$^3$ and an ethylene-propylene copolymer (ethylene content 80 mol %) in a mixing ratio of 70:30 was extruded by means of a screw having a diameter of 50 mm and an effective length of 1,200 mm at 160° C.

The temperature of a die was set at 230° C., and the molding rate was set at 6 m/minute.

In the above manner, there was obtained a tubular container having outer layer/intermediate layer/inner layer thicknesses of 150/50/250 μm, an internal diameter of 40 mm and a length of 150 mm.

The tubular container was irradiated with electron beam at 200 kGy. The so-obtained sample was measured for a hot water free shrinkage factor, gel percentage, resisting force and oxygen permeability. Further, water was filled in the sample and the sample was sterilization-treated at 120° C. for 30 minutes to evaluate the appearance for alteration. Table 4 shows the results.

EXAMPLE 10

Layers having the following constitutions were formed by the co-extrusion under the following conditions to obtain a tubular container.

Outer layer:

A composition (C) (density 0.916 g/cm$^3$) obtained by mixing an intermediate-density polyethylene having a density of 0.938 g/cm$^3$ and a melting point of 125° C. and an ethylene-propylene copolymer (ethylene content 80 mol %) in a mixing ratio of 70:30 was extruded by means of a screw having a diameter of 50 mm and an effective length of 1,200 mm at 190° C.

Adhesion layer 1:

A composition (A) (density 0.916 g/cm$^3$) obtained by mixing a modified intermediate-density polyethylene which was graft modified with 0.17% by weight of maleic anhydride and had a density of 0.938 g/cm$^3$ and an ethylene-propylene copolymer (ethylene content 80 mol %) in a mixing ratio of 70:30 was extruded by means of a screw having a diameter of 40 mm and an effective length of 1,000 mm at 190° C.

Intermediate layer:

"EVAL" (B) (registered trade name, EP-F, MFR 1.3, supplied by Kuraray Co., Ltd.) as a resin having barrier properties against oxygen was extruded by means of a screw having a diameter of 30 mm and an effective length of 750 mm at 225° C.

Adhesion layer 2:

A composition (A) (density 0.916 g/cm$^3$) obtained by mixing a modified intermediate-density polyethylene which was graft modified with 0.17% by weight of maleic anhydride and had a density of 0.938 g/cm$^3$ and an ethylene-propylene copolymer (ethylene content 80 mol %) in a mixing ratio of 70:30 was extruded by means of a screw having a diameter of 40 mm and an effective length of 1,000 mm at 190° C.

Inner layer:

A composition (C) (density 0.916 g/cm$^3$) obtained by mixing an intermediate-density polyethylene having a density of 0.938 g/cm$^3$ and a melting point of 125° C. and an ethylene-propylene copolymer (ethylene content 80 mol %) in a mixing ratio of 70:30 was extruded by means of a screw having a diameter of 50 mm and an effective length of 1,200 mm at 190° C.

In the above manner, there was obtained a tubular container having outer layer/adhesion layer 1/intermediate layer/adhesion layer 2/inner layer thicknesses of 130/20/50/20/230 μm, an internal diameter of 40 mm and a length of 150 mm.

The tubular container was irradiated with electron beam at 200 kGy. The so-obtained sample was measured for a hot water free shrinkage factor, gel percentage, resisting force and oxygen permeability. Further, water was filled in the sample and the sample was sterilization-treated at 120° C. for 30 minutes to evaluate the appearance for alteration. Table 4 shows the results.

COMPARATIVE EXAMPLE 6

Layers having the following constitutions were formed by the co-extrusion under the following conditions to obtain a tubular container.

Outer layer:

A composition (A) (density 0.916 g/cm$^3$) obtained by mixing a modified intermediate-density polyethylene which was graft modified with 0.17% by weight of maleic anhydride and had a density of 0.938 g/cm$^3$ and an ethylene-propylene copolymer (ethylene content 80 mol %) in a mixing ratio of 70:30 was extruded by means of a screw having a diameter of 40 mm and an effective length of 1,000 mm at 190° C.

Intermediate layer:

"EVAL" (B) (registered trade name, EP-F, MFR 1.3, supplied by Kuraray Co., Ltd.) as a resin having barrier properties against oxygen was extruded by means of a screw having a diameter of 30 mm and an effective length of 750 mm at 225° C.

Inner layer:

A composition (A) (density 0.916 g/cm$^3$) obtained by mixing a modified intermediate-density polyethylene which was graft modified with 0.17% by weight of maleic anhydride and had a density of 0.938 g/cm$^3$ and an ethylene-propylene copolymer (ethylene content 80 mol %) in a mixing ratio of 70:30 was extruded by means of a screw having a diameter of 50 mm and an effective length of 1,200 mm at 160° C. The temperature of a die was set at 230° C., and the molding rate was set at 6 m/minute.

In the above manner, there was obtained a tubular container having outer layer/intermediate layer/inner layer thicknesses of 150/50/250 μm, an internal diameter of 40 mm and a length of 150 mm.

The above tubular container was measured for a hot water free shrinkage factor, gel percentage, resisting force and oxygen permeability. Further, water was filled in the tubular container and the container was sterilization-treated at 120° C. for 30 minutes to evaluate the appearance for alteration. Table 4 shows the results.

COMPARATIVE EXAMPLE 7

Layers having the following constitutions were formed by the co-extrusion under the following conditions to obtain a tubular container.

Outer layer:

A modified low-density polyethylene which was graft modified with 0.15% by weight of maleic anhydride and had a density of 0.92 g/cm$^3$ was extruded by means of a screw having a diameter of 40 mm and an effective length of 1,000 mm at 190° C.

Intermediate layer:

"EVAL" (B) (registered trade name, EP-F, MFR 1.3, supplied by Kuraray Co., Ltd.) as a resin having barrier properties against oxygen was extruded by means of a screw having a diameter of 30 mm and an effective length of 750 mm at 225° C.

Inner layer:

A modified low-density polyethylene which was graft modified with 0.15% by weight of maleic anhydride and had a density of 0.91 g/cm$^3$ was extruded by means of a screw having a diameter of 50 mm and an effective length of 1,200 mm at 160° C.

In the above manner, there was obtained a tubular container having outer layer/intermediate layer/inner layer thicknesses of 150/50/250 μm, an internal diameter of 40 mm and a length of 150 mm. The tubular container was irradiated with electron beam at 200 kGy. The so-obtained sample was measured for a hot water free shrinkage factor, gel percentage, resisting force and oxygen permeability. Further, water was filled in the sample and the sample was sterilization-treated treated at 120° C. for 30 minutes to evaluate the appearance for alteration. Table 4 shows the results.

COMPARATIVE EXAMPLE 8

Layers having the following constitutions were formed by the co-extrusion under the following conditions to obtain a tubular container.

Outer layer:

A modified low-density polyethylene which was graft modified with 0.15% by weight of maleic anhydride and had a density of 0.92 g/cm³ was extruded by means of a screw having a diameter of 40 mm and an effective length of 1,000 mm at 190° C.

Intermediate layer:

Nylon as a resin having barrier properties against oxygen was extruded by means of a screw having a diameter of 30 mm and an effective length of 750 mm at 215° C.

Inner layer:

A modified low-density polyethylene which was graft modified with 0.15% by weight of maleic anhydride and had a density of 0.91 g/cm³ was extruded by means of a screw having a diameter of 50 mm and an effective length of 1,200 mm at 160° C.

In the above manner, there was obtained a tubular container having outer layer/intermediate layer/inner layer thicknesses of 150/50/250 µm, an internal diameter of 40 mm and a length of 150 mm. The tubular container was irradiated with electron beam at 200 kGy. The so-obtained sample was measured for a hot water free shrinkage factor, gel percentage, resisting force and oxygen permeability. Further, water was filled in the sample and the sample was sterilization-treated at 120° C. for 30 minutes to evaluate the appearance for alteration. Table 4 shows the results.

TABLE 4

|  | Ex.9 | Ex.10 | CEx.6 | CEx.7 | CEx.8 |
|---|---|---|---|---|---|
| Hot water free shrinkage factor (%) | 2.7 | −2.5 | −3.6 | −4.4 | −1.6 |
| Gel percentage (%) | 55.0 | 60.5 | 0 | 67.7 | 71.1 |
| Resisting force (kgf) | 1.4 | 1.4 | 1.4 | 1.3 | 1.1 |
| Oxygen permeability (cc/day) | 0.002 | 0.002 | 0.002 | 0.002 | 0.05 |
| Appearance after retort treatment (120° C. 30 min.) |  |  |  |  |  |
| Deformation | No | No | No | Yes | Yes |
| Shrinkage | No | No | A | Yes | Yes |

A = Shrank to some extent
Ex. = Example, CEx. = Comparative Example

COMPARATIVE EXAMPLE 9

Layers having the following constitutions were formed by the co-extrusion under the following conditions to obtain a tubular container.

Outer layer:

A composition (C) (density 0.916 g/cm³) obtained by mixing an intermediate-density polyethylene having a density of 0.938 g/cm³ and a melting point of 125° C. and an ethylene-propylene copolymer (ethylene content 80 mol %) in a mixing ratio of 70:30 was extruded by means of a screw having a diameter of 40 mm and an effective length of 1,000 mm at 190° C.

Intermediate layer:

"EVAL" (B) (registered trade name, EP-F, MFR 1.3, supplied by Kuraray Co., Ltd.) as a resin having barrier properties against oxygen was extruded by means of a screw having a diameter of 30 mm and an effective length of 750 mm at 225° C.

Inner layer:

A composition (C) (density 0.916 g/cm³) obtained by mixing an intermediate-density polyethylene having a density of 0.938 g/cm³ and a melting point of 125° C. and an ethylene-propylene copolymer (ethylene content 80 mol %) in a mixing ratio of 70:30 was extruded by means of a screw having a diameter of 50 mm and an effective length of 1,200 mm at 160° C.

In the above manner, there was obtained a tubular container having outer layer/intermediate layer/inner layer thicknesses of 150/50/250 µm, an internal diameter of 40 mm and a length of 150 mm. Since the non-modified polyethylene used for forming the outer layer of the above tubular container was non-polar, it did not adhere to the intermediate layer of the resin having barrier properties against oxygen, and the interlayer peel strength between the inner layer and the intermediate layer was as small as 50 g/15 mm or less. The so-obtained tubular container therefore did not satisfy the function as a laminated tubular container.

What is claimed is:

1. A process for the production of a squeezable tubular laminated container, which comprises irradiating a tubular laminated container formed of inner and outer layers of a composition containing a polyethylene graft-modified with an unsaturated carboxylic acid or its derivative and having a density of 0.900 to 0.975 g/cm³ and an ethylene/propylene copolymer having a density smaller than 0.900 g/cm³, a crystallinity of 10% or less and an intermediate layer of a resin having barrier properties against oxygen with an electron beam to crosslink at least the outer layer of the tubular laminated container, said ethylene/propylene copolymer being present in an amount of 5 to 50 % by weight based on the total amount of the polyethylene and the ethylene/propylene copolymer, thereby providing a tubular laminated container which is sterilizable at 121° C., has a hot water free shrinkage factor of 3% or less, and shows a resisting force of 1.5 kgf or less.

2. The process of claim 1, wherein the resin having barrier properties against oxygen is a polyamide or a saponification product of an ethylene-vinyl acetate copolymer having an ethylene content of 26 to 65 mole %.

3. The process of claim 1, wherein the unsaturated carboxylic acid or its derivative is selected from the group consisting of maleic acid, Nadic acid, and acid anhydrides thereof.

4. The process of claim 1, wherein the amount of unsaturated carboxylic acid or its derivative in the graft-modified polyethylene is 0.001 to 10% by weight based on polyethylene.-

5. The process of claim 1, wherein the irradiation with said electron beam is carried out at a dosage in the range of 50 to 500 kGy.

6. The process of claim 1, wherein the thickness of the outer layer and the thickness of the inner layer are both from 50 to 300 µm, and the thickness of the intermediate layer is from 5 to 150 µm.

7. The process of claim 1, wherein the tubular container has a sealing portion and the tubular container is irradiated with said electron beam to crosslink the composition, the sealing portion of the tubular container being masked during irradiation, thereby providing the tubular container which is heat sealable or ultrasonically sealable.

8. The process of claim 1, wherein said irradiating comprises irradiating the tubular container with said electron beam in a thickness direction at such a dose that the penetration capability of the electron beam, when the relative dose of the electron beam on a surface is 100%, is to 80% in a mid-point of the thickness and 40% or less on the reverse surface, to crosslink the polyethylene and ethylene/propylene copolymer thereby providing the container which is heat or ultrasonically sealable and sterilizable.

9. A process for the production of a squeezable tubular laminated container, which comprises
   1) co-extruding a tubular body comprising an inner and an outer layer of a composition containing a polyethylene graft-modified with an unsaturated carboxylic acid or its derivative and having a density of 0.900 to 0.975 g/cm$^3$ and an ethylene/propylene copolymer having a density smaller than 0.900 g/cm$^3$, and a crystallinity of 10% or less, and an intermediate layer of a resin having barrier properties against oxygen, wherein said ethylene/propylene copolymer is present in an amount of 5 to 50% by weight based on a total amount of the polyethylene and the ethylene/propylene copolymer,
   2) cutting the tubular body at a proper length,
   3) sealing one end of the cut tube, and
   4) irradiating the tubular laminated container with an electron beam to crosslink at least the outer layer of the tubular laminated container, thereby providing the tubular laminated container which is sterilizable at 121° C., has a hot water free shrinkage factor of 3% or less, and shows a resisting force of 1.5 kgf or less.

* * * * *